Patented Nov. 10, 1925.

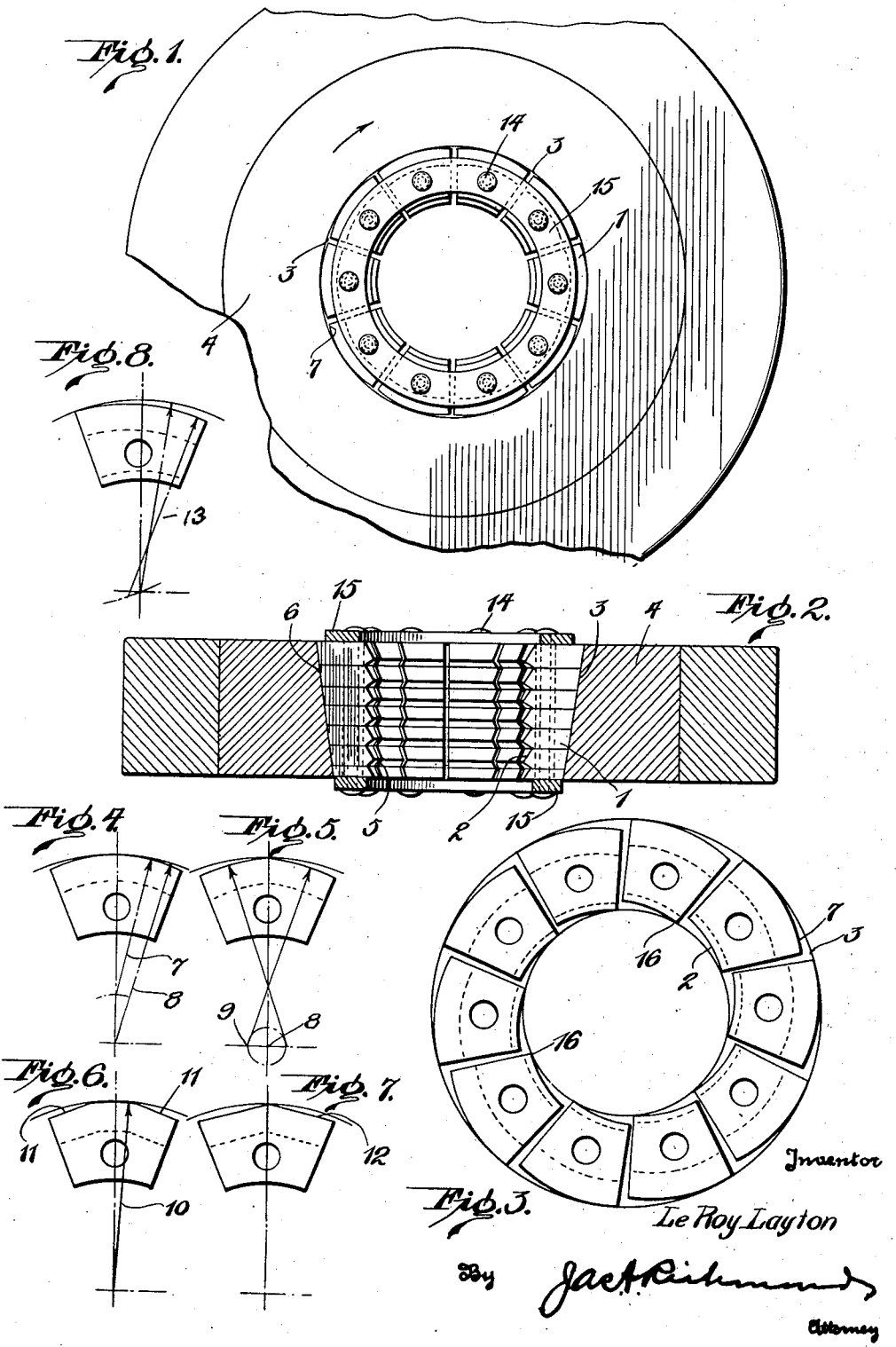

1,560,701

UNITED STATES PATENT OFFICE.

LE ROY LAYTON, OF PHILADELPHIA, PENNSYLVANIA, ASSIGNOR TO TIOGA STEEL AND IRON COMPANY, OF PHILADELPHIA, PENNSYLVANIA, A CORPORATION OF PENNSYLVANIA.

SLIP COLLAR FOR ROTARIES.

Application filed February 27, 1922. Serial No. 539,554.

*To all whom it may concern:*

Be it known that I, LE ROY LAYTON, a citizen of the United States, residing at Philadelphia, in the county of Philadelphia and State of Pennsylvania, have invented certain new and useful Improvements in Slip Collars for Rotaries, of which the following is a specification.

The object of this invention is to provide a multi-section slip collar for rotaries, which, while designed to perform the functions usual to such devices, will also automatically grip and resist rotative movement of the pipe or drill rod.

In multi-section slip collars as heretofore proposed, the slip sections or units are concentrically seated with respect to the bushing or spider in which they are mounted, so that no independent swinging or rocking movement of the sections is possible, hence the interior pipe receiving opening inwardly of the sections remains uniform under all conditions. The present invention provides a non-concentric bearing between the slip sections and spider for the purpose and with the result of permitting swinging, rolling or rocking movement of the slip sections in response to rotary effort of the pipe, whereby they grip or bite into the latter to prevent rotation thereof.

The invention is illustrated in the accompanying drawings, wherein,—

Figure 1 is a plan view of a slip collar embodying my invention.

Fig. 2 is a vertical sectional view of the same.

Fig. 3 is an enlarged plan view, illustrating the gripping operation of the slip sections; and Figs. 4, 5, 6, 7, and 8 are plan views, showing modified forms of non-concentric bearing surfaces.

The slip collar of the present invention comprises a series of identical slip sections 1, the inner surfaces 2 defining the circular inner bearing for the pipe section, and the outer surfaces 3 providing a bearing in a spider or bushing 4.

The inner or pipe engaging surfaces of the sections 1 are serrated or provided with teeth 5, as usual, to prevent the pipe dropping therethrough, while the outer surfaces are downwardly and inwardly inclined as at 6 to prevent the slip collar as a whole from dropping through the spider, while permitting the slip collar to be readily lifted from the spider when necessary. These specific details are of well-known construction and function.

In slip collars heretofore provided, the sections 1 are concentrically mounted with respect to the spider, and hence there can be no independent movement of the sections under any rotative movement of the pipe.

The sections 1 of the present invention, however, have a non-concentric bearing on the cone seat of the spider, and it will be apparent that this non-concentric bearing can be secured through various formations of the outer faces of the sections. For example, as indicated in Figs. 3 and 4, the bearing surface 3 of the section is formed with a radius, as 7, smaller than the radius 8 of the spider opening. In Fig. 5, the outer surface is the same as the spider opening radius 8, but of two-arc formation with the center of the radii 9 removed from and on opposite sides of the center of the radius 8. In Fig. 6, the central portion of the outer surface 3 is of the same radius as the spider, and from this central concentric portion 10 the outer surface of the section is relieved by a straight face 11 toward each side, or, if preferred, these relieved portions may be formed on the same radius as the spider, but with the center of such radius removed from the spider radius center, as in Fig. 5. In Fig. 7, the outer face 3 of each section is relieved from a central point therein toward each side by straight faces 12. In Fig. 8, the section outer face radius 13 may be the same as the spider opening radius, but is off-center with respect to such spider opening radius.

Thus in all forms there is a non-concentric bearing between the slip sections and the spider. The slip sections are movably supported on pivot pins 14, secured above and below the sections in bearing rings 15.

Owing to the non-concentric bearing between the slip sections and the spider, it is apparent that under any rotative movement of the pipe or other element arranged within the slip collar, the sections will rock on their pin supports to present edges, as 16, to the element and further rotative movement of the pipe will cause said edges to bite into the latter and hold the same against rotative movement.

Having thus described the invention, what is claimed as new, is,—

1. A multisection slip collar having slip sections mounted for independent rocking movement to present a portion of their pipe-gripping edges inwardly of their normal positions for pipe gripping purposes.

2. A multisection slip collar having slip sections pivotally mounted for independent rocking to thereby present a series of gripping edges inwardly of the normal pipe opening defined by such edges.

3. A slip collar having gripping sections mounted for a rocking movement to present a series of gripping edges inwardly of the normal pipe defining opening, and means to support all sections as a unit.

4. A unitary slip collar comprising a spider and a plurality of gripping sections independently mounted in the spider, each of the sections being movable on its pivot to present a pipe-gripping opening made up of the edges of the sections.

5. A unitary slip collar comprising a series of slip sections formed on their inner surfaces to define a pipe opening, the sections being mounted for independent movement to arrange their similar edges in position to grip an article in said opening.

In testimony whereof I affix my signature.

LE ROY LAYTON.